(12) United States Patent
Auracher

(10) Patent No.: US 6,643,740 B1
(45) Date of Patent: Nov. 4, 2003

(54) RANDOM REPLACEMENT GENERATOR FOR A CACHE CIRCUIT

(75) Inventor: Stefan Auracher, Baierbrunn (DE)

(73) Assignee: LSI Logic Corporation, Milpitas, CA (US)

( * ) Notice: Subject to any disclaimer, the term of this patent is extended or adjusted under 35 U.S.C. 154(b) by 116 days.

(21) Appl. No.: 09/918,011

(22) Filed: Jul. 30, 2001

(51) Int. Cl.[7] ............................................. G06F 12/00
(52) U.S. Cl. ........................................................ 711/133
(58) Field of Search ................... 711/133, 134, 711/159

(56) References Cited

U.S. PATENT DOCUMENTS

| | | | | | |
|---|---|---|---|---|---|
| 5,568,632 | A | * | 10/1996 | Nelson | 711/133 |
| 5,701,431 | A | * | 12/1997 | Whittaker | 711/128 |
| 5,875,465 | A | * | 2/1999 | Kilpatrick et al. | 711/134 |
| 6,223,256 | B1 | * | 4/2001 | Gaither | 711/134 |
| 6,374,341 | B1 | * | 4/2002 | Nijhawan et al. | 711/207 |
| 6,405,287 | B1 | * | 6/2002 | Lesartre | 711/128 |
| 6,446,168 | B1 | * | 9/2002 | Normoyle et al. | 711/128 |
| 2002/0174160 | A1 | * | 11/2002 | Gatto et al. | 709/1 |
| 2002/0188808 | A1 | * | 12/2002 | Rowlands et al. | 711/133 |
| 2002/0199064 | A1 | * | 12/2002 | Kim et al. | 711/128 |

* cited by examiner

*Primary Examiner*—Kevin Verbrugge
(74) *Attorney, Agent, or Firm*—Christopher P. Maiorana PC

(57) ABSTRACT

A cache may comprise a memory and control logic. The memory may be configured for storing data buffered by the cache. The control logic may be configured controlling accesses to the memory. The control logic may comprise a pseudo-noise generator and a trigger device. The pseudo-noise generator may be configured for generating a pseudo-random number representing, for a miss access requiring allocation, which of a plurality of possible addresses in the memory to use for the allocation. The trigger device may be configured for controlling a cycle of the pseudo-noise generator to output the pseudo-random number therefrom.

21 Claims, 5 Drawing Sheets

RANDOM REPLACEMENT GENERATOR FOR A CACHE CIRCUIT

FIELD OF THE INVENTION

The present invention relates to a digital cache and to a random replacement generator for use in a digital cache. The invention is especially suitable for implementation in an associative cache.

BACKGROUND TO THE INVENTION

A cache is a circuit which includes its own internal memory, and control logic for controlling whether the internal memory can be used to service (buffer) a read or write access supplied to the cache, or whether this access is passed through the cache to a downstream device. When a certain address is already buffered by the cache, then an access to that address is referred to as a cache-hit. When a certain address is not already buffered, then an access to that address is referred to as a cache-miss.

In the event of a cache-miss, then a portion of the memory is, or can be, newly allocated to buffer the data for a future access. This is referred to herein as a "miss with allocation". Generally, if the cache-miss is a result of a read-access (a "read-miss"), then the miss does result in new allocation, so that the data is buffered. If the cache-miss is a result of a write-access (a "write-miss"), then allocation depends more on the particular write-strategy implemented in the cache. Since the internal memory of the cache is typically several orders of magnitude smaller than the range of addresses it has to service, the internal memory rapidly fills, and each new allocation has to replace (i.e. overwrite) an existing allocation.

A known type of cache is a so-called associative cache, in which the control logic and the internal memory are configured such that there are several internal addresses (so called "ways") available for each external memory location which is serviced by the cache. In other words, each serviced address can be associated with a plurality of internal addresses for data storage. The number of ways (i.e. the number of possible locations available) for each external address is limited by the design or programming of the cache. In a so-called fully-associative cache, each external address can be mapped anywhere in the internal memory. In a so-called set-associative cache, sets or groups of addresses are mapped statically to an external address, and each set has several ways that represent the associativity.

Whenever a new allocation takes place for which all of the possible ways have already been allocated, then it is necessary for the control logic to implement a replacement algorithm to decide which currently occupied way will be overwritten with new data (and hence replaced in the cache). Various replacement algorithms are known in the art, for example:

Least Recently Used—the algorithm determines which of the ways was accessed the least recently, and selects that way to be overwritten. This usually leads to a very good performance of the cache, but requires additional memory overhead to record time usage, is complicated to implement, and is slow in use.

Random—a random number is generated that determines which way to replace. Random algorithms are commonly used, as they are relatively easy to implement and normally result in good cache performance.

Round Robin—the ways are accessed in a fixed sequence, by using a pointer to record which way was accessed most recently, and then accessing the next way in sequence. This can be applied on a global scale or locally with a set. However, round-robin algorithms are generally avoided as they mostly lead to poor cache performance.

The present invention relates to a random replacement generator. The most common technique for implementing this is as a free running counter, e.g. as a simple incremental counter or a sequential code counter (such as a gray code generator). The count value is modified with every clock-period. When a replacement is necessary, the current count value (or certain bits of the value) is read as the random number. Since replacements occur with irregular frequency (due to varying access-series in a program, waitstates, actions of other bus masters, interrupts, etc) this results in pretty good random behaviour.

The main disadvantage of a free running counter is that it wastes power. As the counter value changes on every clock cycle, parasitic capacitances have to be charged or discharged with logic level changes during each clock period. As a result, a free running counter contributes undesirably to the power consumption of the cache, since the counter keeps running even if the cache is not currently servicing a read or write access.

Clock gating has been used to try to reduce the power consumption by advancing the counter only during an access (or only during certain types of access) to the cache. During other periods, the counter is paused. Although this can reduce the power consumption, it drastically affects the "randomness" of the number generated by the counter, since the counter value is no longer independent. In some cases, depending on a particular sequence of read and write access types to the cache, the counter may turn into a round-robin generator, which results in low cache performance. It is also highly undesirable that the cache performance be dependent on a particular sequence of access types to the cache.

The fundamental problem with a counter is that its "randomness" depends on the counter being able to run for a period which is independent of the "reads" of the random numbers. However, such running results in increased power consumption.

In a different field, namely the communications field, pseudo-noise generators are known for encrypting CDMA signals based on a secret code. The output is a signal which resembles noise, but which can be decrypted based on the secret code. The pseudo-noise generators operate continuously based on an input signal.

SUMMARY OF THE INVENTION

The present invention concerns a cache. The cache may comprise a memory and control logic. The memory may be configured for storing data buffered by the cache. The control logic may be configured for controlling accesses to the memory. The control logic may comprise a pseudo-noise generator and a trigger device. The pseudo-noise generator may be configured for generating a pseudo-random number representing, for a miss access requiring allocation, which of a plurality of possible addresses in the memory to use for the allocation. The trigger device may be configured for controlling a cycle of the pseudo-noise generator to output the pseudo-random number therefrom.

The objects, features and advantages of the invention include (i) providing a high degree of "randomness" and/or (ii) reducing the power consumption of the cache.

BRIEF DESCRIPTION OF THE DRAWINGS

These and other objects, features and advantages of the present invention will be appreciated from the following detailed description and the appended claims and drawings in which:

DESCRIPTION OF PREFERRED EMBODIMENTS

Figure 1:
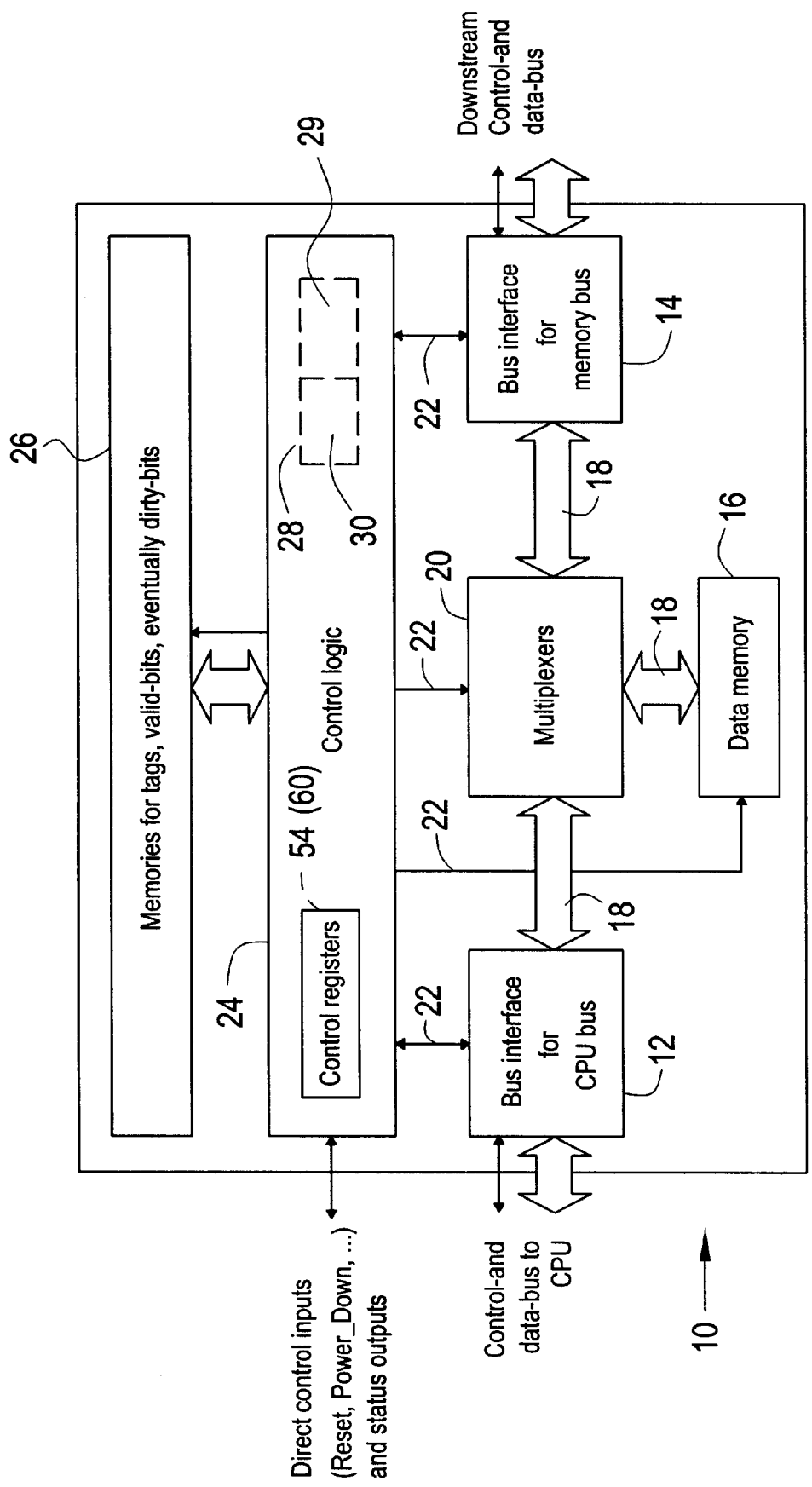
FIG. 1 is a schematic block diagram showing the functional components of an associative cache.

FIG. 1 shows the functional components of an associative cache 10. The cache may be implemented in an integrated circuit either on its own, or in combination with other circuitry (such as an upstream processor device and downstream cached memory). The cache 10 includes a processor interface 12 for coupling to a processor (or other master device), a peripheral interface 14 for coupling to a peripheral bus for downstream devices, and an internal cache memory 16 for storing buffered data. Bi-directional buses 18 from the interfaces 12 and 14 and from the memory 16 are linked by a multiplexer 20 which functions to route data between the buses 18. The interfaces 12 and 14, the memory 16 and the multiplexer 20 are controlled by control signals 22 from control logic 24, which controls overall operation of the cache 10 in response to read and write accesses supplied thereto via the processor interface 12. A memory area 16 is coupled to the control logic for the storage of various control data.

In this embodiment, the cache 10 is organised as an associative cache, which means that each external address serviceable by the cache is associated with a plurality of possible internal addresses (blocks or ways) for storing the data in the internal memory 16. Whenever a cache-miss occurs which requires a portion of memory to be newly allocated to buffer that data (i.e. a "miss with allocation"), the control logic 24 determines which block (e.g., which of the possible internal addresses associated with that external address) is to be newly allocated to buffer the data. The block value is stored in the memory area 16 so that, when the same external address is serviced during a subsequent read-hit in the cache, the correct internal address can be accessed.

Figure 2:
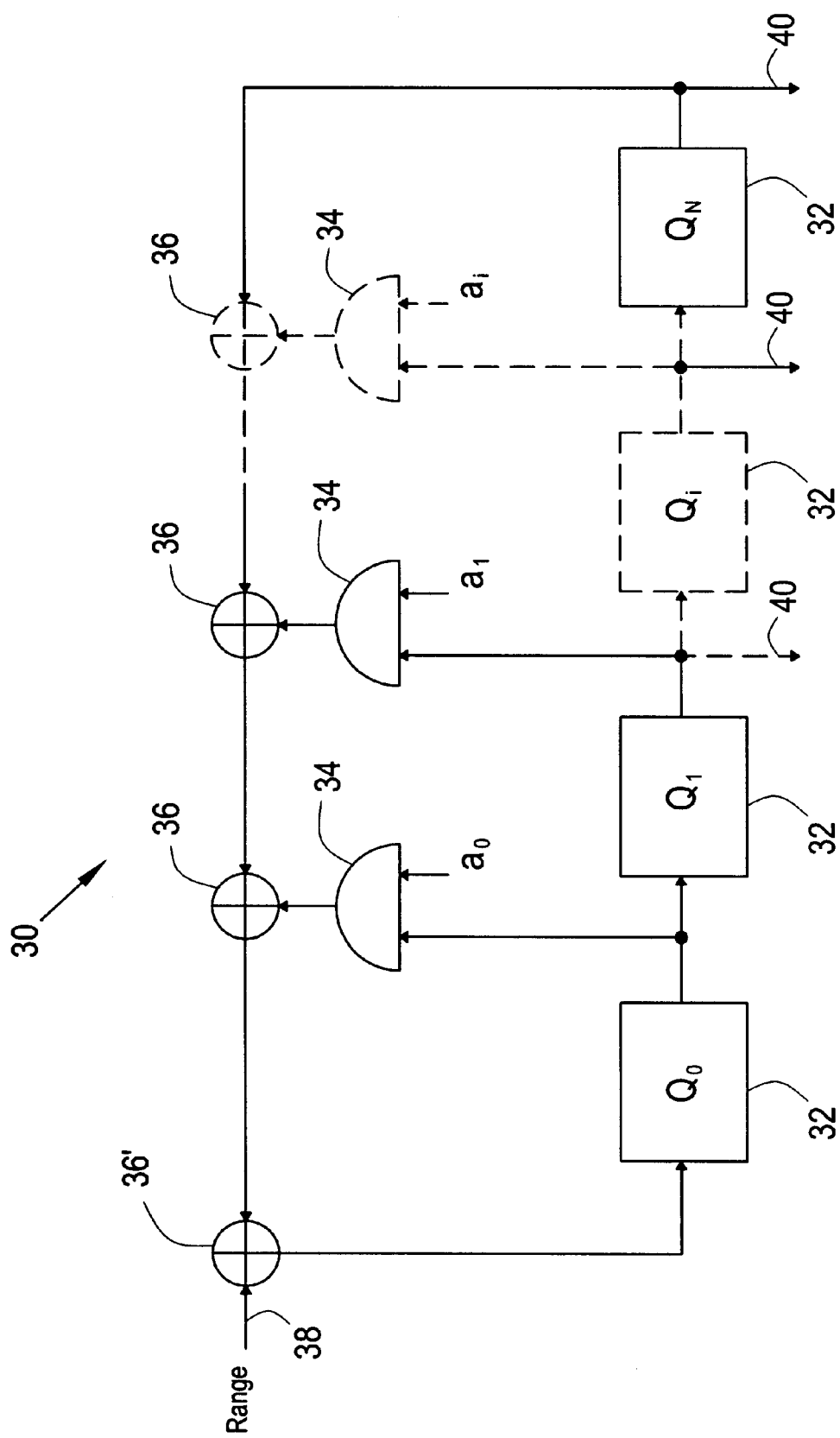
FIG. 2 is a schematic diagram showing the functional blocks of a pseudo-noise generator as the random number generator.

The control logic includes a random number generator 28 for generating random replacement data to determine which block will be replaced by new data when a miss with allocation occurs for which all of the associated blocks have already been used (as discussed previously). The random number generator 28 includes a pseudo-noise circuit 30, and a trigger circuit 29 for applying a single-shot signal to clock the pseudo-noise circuit by one cycle. FIG. 2 shows the principle of the pseudo-noise generator 30 but, as will be explained in more detail below, some of the circuit elements may be "reduced" or "vanished" when the circuit is implemented in hardware. However, the full system is shown in FIG. 2 to show the principle of operation.

The pseudo-noise generator is based on a plurality (N+1) of flip-flops 32 ($Q_0 \ldots Q_N$) coupled in series such that the output from one flip-flop is fed as the input to the next. This transfer takes place when the single-shot trigger signal is received from trigger circuit 29 to clock the pseudo-noise circuit. Additionally, the outputs from the first N flip-flops are fed to the inputs of respective AND-gates 34 which also receive respective coefficient data $a_0 \ldots a_{N-1}$. Each coefficient is a binary value which is ANDed with the flip-flop data in the respective AND-gate 34. The output from the last flip-flop $Q_N$ is fed back through a plurality (N+1) of exclusive-OR (XOR) gates 36. The XOR gates 36 act as modulo-2 adders for combining the outputs from the AND-gates in sequence in order to modify the data in the return path in a pseudo-random manner. The final XOR gate 36' receives a range coefficient input 38, and the output from this last XOR gate 36' is fed as the input to the first flip-flop $Q_0$, to form a closed loop circuit.

The effect of each coefficient $a_0 \ldots a_{N-1}$ is to determine whether the output from the respective flip-flop $Q_0 \ldots Q_{N-1}$ is applied as a stimulus signal to cause the respective XOR gate 36 to modify the data on the loop path. Each AND gate 34 therefore acts as a switch in response to the coefficients $a_0 \ldots a_{N-1}$ (switching or stimulus coefficients). If the coefficient is a logical-0, then the output from the respective AND-gate 34 will be blocked (i.e. always logical-0), and so the loop signal will pass through the respective XOR-gate 36 unchanged. If the coefficient is a logical-1, then the output from the respective AND-gate 34 will be the same as the output from the respective flip-flop 32. If this flip-flop output is logical-0, then the loop signal will pass through the respective XOR-gate 36 unchanged; if the flip-flop output is logical-1, then the loop signal will be inverted by the respective XOR gate 36.

The number (N+1) of flip-flops 32 is at least equal to, and preferably greater than, the number of bits (k) required to form the desired random number. The random number is formed by the outputs of a number (k) of the flip-flops 32 (as indicated by outputs 40), which form a data word representing a random value. Each time that the circuit is "clocked", the binary values in the flip-flops (32) are shifted one position to the right, into the adjacent flip-flops, and a new "random" binary value (either 0 or 1) is produced from the final XOR gate 36' and inputted to the first flip-flop $Q_0$. Although the binary values are shifted one place to the right, the new "random" binary value represents a new most significant bit (MSB) of the data word, and the number represented by the data word will therefore follow an apparently random sequence.

There are two factors which affect the "randomness" of the pseudo-noise circuit 30:

(a) the number (N+1) of flip-flops 32. Generally, the randomness increases with the number of flip-flops, since the generation of the new binary value is based on a large number of inputs. It is preferred that the number of flip-flops be greater than the number (k) of bits used to form the output random number.

(a) the choice of the coefficients $a_0 \ldots a_{N-1}$. Suitable coefficients can be chosen to optimise the apparently random nature depending on the number of flip-flops.

Therefore, the randomness does not depend on the period for which the circuit is clocked, and a single-clock pulse can be applied to generate a new pseudo-random number output (also referred to as single-shot operation). Such single-shot operation can advantageously reduce the power consumption of the cache 10 compared to a cache in which a free running counter (or other free-running random number generator) is used. Although FIG. 2 generally indicates that the rightmost flip-flops in the circuit loop are used to provide the output, the choice of flip-flops is completely arbitrary. Also, the order of the bits in the output word could be modified if desired. Additionally, or alternatively, a flip-flop from which no output bit is taken could be interposed between two flip-flops from which output bits are taken.

A feature of the pseudo-noise generator is that its output range is limited to $(2^N-1)$ values. The range has to exclude either the value 0 (in which all registers are zero), or the maximum value (in which all registers are set). The range coefficient 38 offers the possibility to choose whether the pseudo-noise generator returns values from 1 to $(2^N-1)$ for a range coefficient of 0, or from 0 to $(2^N-2)$ for a range coefficient of 1. Normally, the desired range is dictated by the design of the control logic, and is fixed during design. The last XOR-gate 36' in the loop can either be omitted altogether (if the coefficient is set to 0 for the design), or it can be replaced by a simple inverter (if the coefficient is set to 1 for the design). Therefore, in the following detailed embodiments, the last XOR-gate 36' is surrounded by a broken line 40 to signify that it can be "reduced" in the final hardware circuit.

Figure 3:
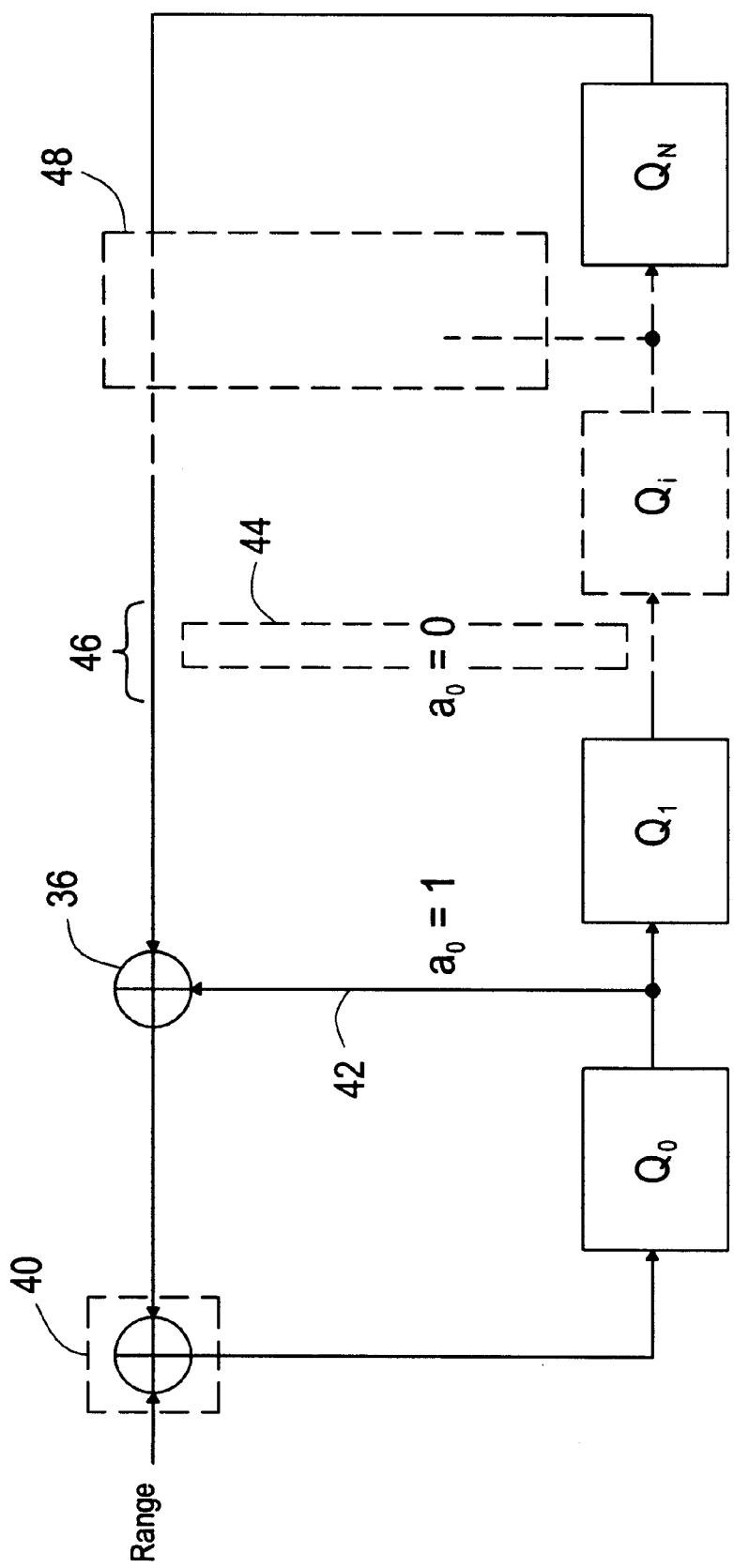
FIG. 3 is a schematic block diagram of a pseudo-noise generator with a single set of fixed hardware coefficients in accordance with a first embodiment.

Three specific hardware implementations of the pseudo-random noise generator are now described as detailed embodiments. FIG. 3 illustrates a first embodiment in which the coefficients $a_0 \ldots a_{N-1}$ are predetermined in hardware, and cannot be varied. Such an embodiment is useful, for example, if the coefficients are optimised for a particular specific application of the cache 10. With such an embodiment, many of the circuit elements of FIG. 2 can be simplified (or "reduced"), since the coefficients are known in the circuit design, and never vary. As explained previously (in relation to FIG. 2), the combination of each AND-gate 34 and its respective coefficient $a_i$ acts as a simple switch to determine whether or not the output from the respective flip-flop $Q_i$ is fed as a stimulus input to the respective XOR-gate 36. A logical-1 coefficient corresponds to a connection, and a logical-0 corresponds to no-connection (i.e. a logical-0 then being permanently applied to the input of the respective XOR gate 36).

In FIG. 3, the first coefficient $a_0$ is set to be a logical-1, and so the first AND gate and its coefficient input are replaced in hardware by a simple connection 42 from the output of the first flip-flop $Q_0$ to the respective XOR gate 36. In contrast, the second coefficient $a_1$ is set to be a logical-0, and so the second AND gate constantly returns a logical-0. Hence the AND-gate and the connection wire (depicted schematically by 44) can be replaced by a logical-0 tied to the stimulation input of the XOR gate 36. As furthermore the XOR gate 36 with one input tied to a logical-0 will never change the data in the return path, it can be replaced by a simple connection 46. The remaining coefficients are similarly replaced by: connections 42; or no connections 44 and XOR replacement connections 46. (This is indicated schematically in FIG. 3 at 48.) It will be appreciated that such fixed coefficients can simplify the circuit significantly, and lead to even greater power efficiency.

Figure 4:
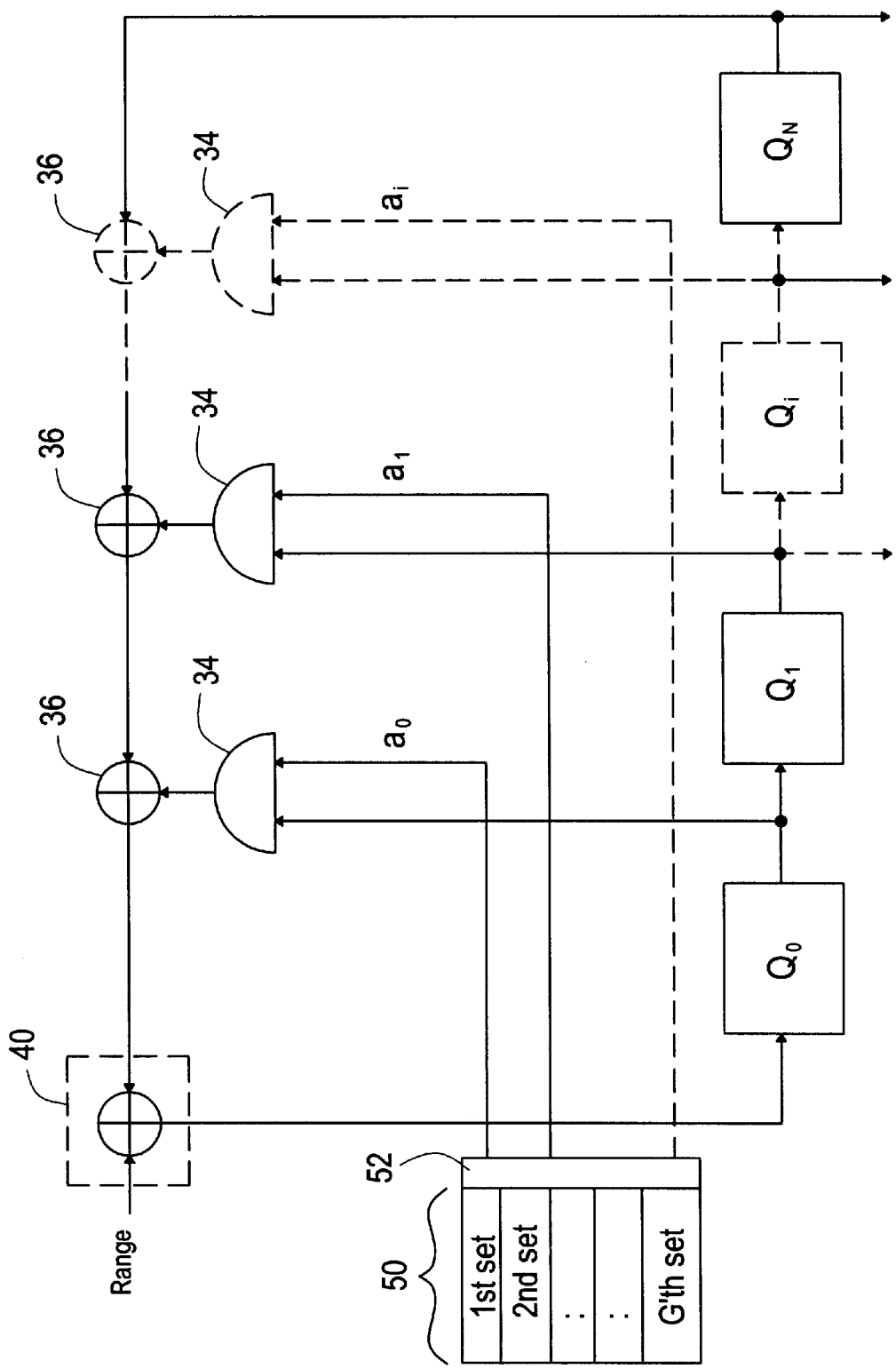
FIG. 4 is a schematic block diagram of a pseudo-noise generator with selectable fixed sets of coefficients in accordance with a second embodiment.

FIG. 4 illustrates a second embodiment which enables external selection of one of a plurality of fixed sets of coefficients. Such an embodiment would be useful if, for example, different sets of coefficients were optimised for different cache situations or for different applications. The different sets of coefficients are defined in a hardwired array 50, and a multiplexer 52 selects which set of the coefficients are provided to the inputs of the AND-gates 34. The multiplexer is controlled by a selection value stored in a selection register 54 in the control logic 24. The plurals sets of coefficients are predefined as hardware. If desired, the array 50 may be implemented as part of the multiplexer 52 in a hybrid circuit.

In this embodiment, all of the XOR-gates 36 and all of the AND-gates 34 are retained to accommodate all possible values of the coefficients. However, it will be appreciated that, if a particular coefficient was always a logical-1 in all sets, then the respective AND-gate could be replaced by a connection 42 as shown in the first embodiment. Similarly, if a particular coefficient was always a logical-0 in all sets, then the respective AND-gate could be replaced by a no-connection 44, and the respective XOR gate replaced by a bypass connection 46 as shown in the first embodiment.

Figure 5:
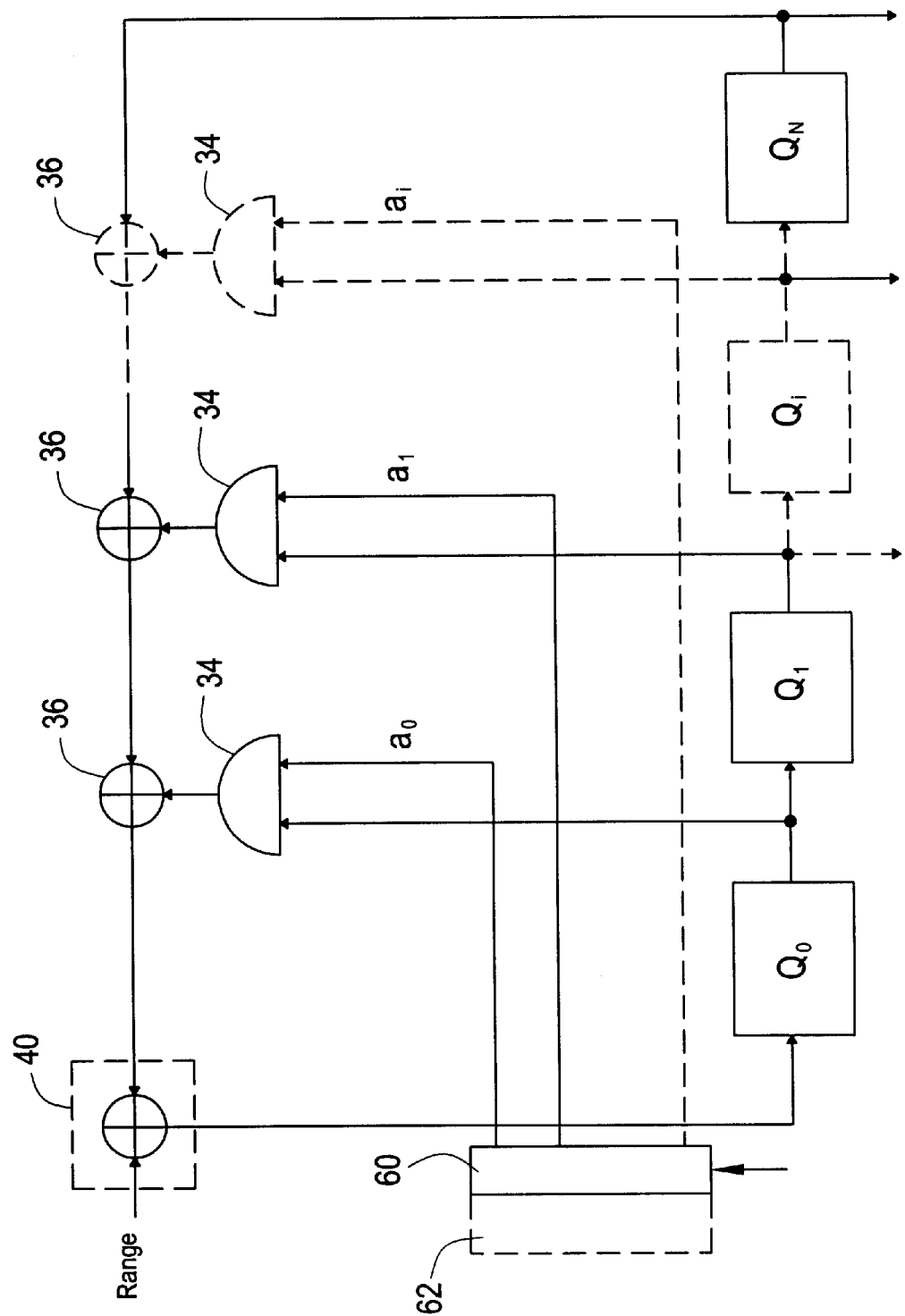
FIG. 5 is a schematic block diagram of a pseudo-noise generator with programmable coefficients in accordance with a third embodiment.

FIG. 5 illustrates a third embodiment which enables the coefficients $a_0 \ldots a_{N-1}$ to be programmed externally. A register 60 stores the coefficients, and the values in the register are programmable from an external input signal via the control logic 24. In this embodiment, all of the XOR-gates 36 and all of the AND-gates 34 are retained to accommodate all possible values of the coefficients. This embodiment can provide the greatest amount of flexibility in enabling the coefficients to be defined externally. However, additional circuit overhead is required in the form of the multi-bit register 60 for storing the coefficients. If desired, the control logic 24 may be operable to load the register 60 with a set of default values defined, for example, by a hardwired (i.e. fixed) register 62 in the control logic 24.

The principles of the above embodiments may also be combined to enable external selection of one of a plurality of sets of predefined (fixed) coefficients, or selection of an externally programmable set of coefficients.

The register 54 or 60 may be programmed by being memory mapped within the cache. This means that certain addresses are reserved for the cache. When these addresses are written to by a CPU, the values are loaded into the control registers 54/60.

It will be appreciated that the invention, particularly as described in the preferred embodiments, can provide a random replacement generator which can provide a high degree of "randomness" with little power consumption. In particular, the use of a single-shot pseudo-noise generator can reduce the power consumption advantageously compared to a prior art device using a continuously free-running counter. The foregoing description is merely illustrative of preferred examples of the invention, and is not intended to limit the invention in any way. The skilled man will also readily understand that many modifications, equivalents and improvements may be used within the scope and principles of the invention, and the appended claims are intended to be interpreted broadly to include all such modifications, equivalents and improvements.

What is claimed is:

1. A cache comprising:
    a memory for storing data buffered by said cache;
    control logic for controlling accesses to said memory, wherein said control logic comprises:
        a pseudo-noise generator for generating a pseudo-random number representing, for a miss access requiring allocation, which of a plurality of possible addresses in said memory to use for said allocation; and
        a trigger device for controlling a cycle of said pseudo-noise generator to output said pseudo-random number therefrom.

2. The cache according to claim 1, wherein said trigger device is operable to control a single-shot cycle of said pseudo-noise generator to generate said random number.

3. The cache according to claim 1, wherein said control logic further comprises at least one register for storing variable control data, and wherein said control logic is operable to control stimulus coefficients applied to said pseudo-noise generator in response to said control input.

4. The cache according to claim 3, wherein said control logic further comprises a selector for selecting a set of stimulus coefficients from a plurality of sets of stimulus coefficients in response to said control input.

5. The cache according to claim 4, wherein at least one set of said plurality of sets of stimulus coefficients is predefined in said cache.

6. The cache according to claim 3, wherein said register comprises a coefficient register for storing said stimulus coefficients, and wherein said stimulus coefficients are programmable in said register.

7. The cache according to claim 1, wherein said pseudo-noise generator comprises:

a plurality of flip-flops coupled serially from a first flip-flop to a last flip-flop;

a return path leading from an output of said last flip-flop to an input of said first flip-flop, said return path including at least one modifier gate for modifying a data value on said return path in response to at least one modifier stimulus signal applied to said at least one modifier gate;

and at least one stimulus signal path for applying said at least one modifier stimulus signal from an output of at least one of said plurality of flip-flops to said at least one modifier gate.

8. The cache according to claim 7, wherein said modifier gate comprises an exclusive-OR gate.

9. The cache according to claim 7, wherein said pseudo-noise generator further comprises a plurality of said modifier gates in said return path and a corresponding plurality of said stimulus signal paths from respective outputs of different ones of said plurality of flip-flops.

10. The cache according to claim 7, wherein said stimulus path is a direct connection from said output of a respective flip-flop to said modifier gate.

11. The cache according to claim 7, wherein said stimulus path includes a switching gate for selectively applying or blocking said stimulus signal on said stimulus signal path in response to a switching coefficient value applied to said switching gate.

12. The cache according to claim 11, wherein said switching gate comprises an AND gate.

13. The cache according to claim 7, further comprising a range modifier gate for inverting said data value in said return path in order to set a range of values which can be generated by said pseudo-noise generator.

14. The cache according to claim 7, wherein said pseodo-random number is represented as a word of binary bits, and wherein a number of said flip-flops is not less than a number of binary bits in said word.

15. The cache according to claim 14, wherein said number of said flip-flops is greater than said number of bits in said word.

16. A method of block replacement in a cache, comprising the steps of:

(A) detecting a block replacement condition in said cache;

(B) generating a pseudo-random number from a pseudo-noise circuit in response to said detecting; and (C) replacing a block of said cache as determined by said pseudo-random number.

17. A method according to claim 16, further comprising stopping a clock signal used by said pseudo-random number generator.

18. A method according to claim 16, further comprising the step of clocking said pseudo-random noise circuit only once to generate said pseudo-random number.

19. A method according to claim 16, further comprising the step of setting a coefficient used for generating said pseudo-random number prior to said generating.

20. A method according to claim 19, further comprising the step of changing said coefficient in response to stopping said clock.

21. A cache comprising:

means for detecting a block replacement condition in said cache;

pseudo-random noise means for generating a pseudo-random number in response to said means for detecting; and means for replacing a block of said cache as determined by said pseudo-random number.

* * * * *